United States Patent
Iwase et al.

(10) Patent No.: US 8,599,207 B2
(45) Date of Patent: Dec. 3, 2013

(54) INFORMATION PROCESSING APPARATUS, INFORMATION PROCESSING METHOD AND PROGRAM

(75) Inventors: Shunichiro Iwase, Kanagawa (JP); Keisuke Koide, Tokyo (JP); Tatsuya Tobe, Saitama (JP); Takeshi Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1258 days.

(21) Appl. No.: 11/645,015

(22) Filed: Dec. 22, 2006

(65) Prior Publication Data

US 2007/0171230 A1   Jul. 26, 2007

(30) Foreign Application Priority Data

Dec. 27, 2005  (JP) ............................. P2005-375993

(51) Int. Cl.
*G06F 15/00* (2006.01)
*G06T 1/20* (2006.01)
*G06T 15/00* (2011.01)
*G09G 5/36* (2006.01)

(52) U.S. Cl.
CPC ............ *G06T 1/20* (2013.01); *G06T 15/005* (2013.01); *G09G 5/363* (2013.01)
USPC ........... 345/501; 345/502; 345/503; 345/504; 345/505; 345/506

(58) Field of Classification Search
CPC ......... G06T 1/20; G06T 15/005; G09G 5/363
USPC ................................ 345/501–506
See application file for complete search history.

(56) References Cited

U.S. PATENT DOCUMENTS

| | | | |
|---|---|---|---|
| 5,801,776 A * | 9/1998 | Tamura et al. | 375/240.18 |
| 5,926,166 A * | 7/1999 | Khederzadeh et al. | 345/581 |
| 6,304,244 B1 * | 10/2001 | Hawkins et al. | 345/502 |
| 6,567,950 B1 * | 5/2003 | Bertin et al. | 714/767 |
| 6,734,862 B1 | 5/2004 | Chapple et al. | |

(Continued)

FOREIGN PATENT DOCUMENTS

| | | |
|---|---|---|
| JP | 05297993 A | 11/1993 |
| JP | 11233984 A | 8/1999 |

(Continued)

OTHER PUBLICATIONS

Office Action from Japanese Application No. 2005-375993, dated Oct. 18, 2011.

(Continued)

*Primary Examiner* — Jin-Cheng Wang
(74) *Attorney, Agent, or Firm* — Lerner, David, Littenberg, Krumholz & Mentlik, LLP (57) ABSTRACT

An information processing apparatus includes a first graphics chip having a first drawing processing capacity and being capable of producing a first image signal; a second graphics chip having a second drawing processing capacity higher than the first drawing processing capacity and being capable of producing a second image signal; an output changeover section capable of selectively outputting one of the first or second image signals; an inputting section configured to input a user operation to select one of the first graphics chip or the second graphics chip; and a control section configured to control the output of the output changeover section in response to the inputted user operation.

12 Claims, 8 Drawing Sheets

(56) References Cited

U.S. PATENT DOCUMENTS

| | | | |
|---|---|---|---|
| 6,832,312 B1 * | 12/2004 | Rochford, II | 713/100 |
| 6,850,240 B1 * | 2/2005 | Jones, Jr. | 345/503 |
| 6,859,208 B1 | 2/2005 | White | |
| 6,864,891 B2 * | 3/2005 | Myers | 345/502 |
| 7,782,325 B2 * | 8/2010 | Gonzalez et al. | 345/505 |
| 7,782,327 B2 * | 8/2010 | Gonzalez et al. | 345/505 |
| 8,004,530 B2 * | 8/2011 | Gaiot et al. | 345/502 |
| 2003/0122811 A1 * | 7/2003 | Hu | 345/211 |
| 2006/0007203 A1 | 1/2006 | Chen et al. | |
| 2006/0022988 A1 * | 2/2006 | Soroushi et al. | 345/564 |

FOREIGN PATENT DOCUMENTS

| | | |
|---|---|---|
| JP | 11-353495 A | 12/1999 |
| JP | 2001084363 A | 3/2001 |
| JP | 2001306196 A | 11/2001 |
| JP | 2001-352373 A | 12/2001 |
| JP | 2002044682 A | 2/2002 |
| JP | 2003114744 A | 4/2003 |
| JP | 2004-503859 T | 2/2004 |
| JP | 2004-510250 T | 4/2004 |
| JP | 3107450 U | 2/2005 |
| JP | 2005301905 A | 10/2005 |
| JP | 2005316855 A | 11/2005 |
| JP | 2005353090 A | 12/2005 |
| JP | 2006318420 A | 11/2006 |
| WO | 2005099397 A2 | 10/2005 |

OTHER PUBLICATIONS

Hiroyuki Ozaki, Strategy of BIOS for each motherboards, Clarification of main BIOS, All about BIOS, Japan, Eiai publication inc., Nov. 2, 2000, the first edition, 56 pages.

Office Action from Japanese Application No. 2005-375993, dated May 8, 2012.

Office Action from Japanese Application No. 2011-039677, dated May 1, 2012.

Office Action from Japanese Application No. 2011-039677, dated Jul. 31, 2012.

Office Action from Japanese Application No. 2005-375993, dated Jan. 4, 2011.

* cited by examiner

INFORMATION PROCESSING APPARATUS, INFORMATION PROCESSING METHOD AND PROGRAM

CROSS-REFERENCE TO RELATED APPLICATIONS

The present application claims priority from Japanese Patent Application No. JP 2005-375993, filed on Dec. 27, 2005, the disclosure of which is hereby incorporated by reference herein.

BACKGROUND OF THE INVENTION

1. Field of the Invention

This invention relates to an information processing apparatus which includes a graphics chip which performs a drawing process, an information processing method and a program.

2. Description of the Related Art

In recent years, together with enhancement of the performance of an information processing apparatus such as a PC (Personal Computer), a high drawing processing capacity is demanded for a graphics chip which takes charge of a drawing process in an information processing apparatus. Meanwhile, particularly for a notebook type PC, also low power consumption and elongation of the battery duration are demanded.

A notebook type PC conventionally includes a single graphics chip incorporated therein. Generally, a graphics chip has such reciprocity that, where it has a high drawing processing capacity, it exhibits high power consumption, but where it exhibits low power consumption, it has a drawing processing capacity lower than that of a graphics chip which exhibits high power consumption. In particular, when it is tried to incorporate a graphics chip into a notebook type PC, it cannot be avoided to select either one of a graphics chip which has a high drawing processing capacity but exhibits high power consumption and another graphics chip which has a low drawing processing capacity but exhibits low power consumption.

Accordingly, particularly with regard to an information processing apparatus produced with importance attached to the mobility like a notebook type PC, it is demanded by some user that, for example, where an AC adapter is connected to the information processing apparatus, a graphics chip having a high drawing processing capacity be used, but where the information processing apparatus is driven by a battery, importance be attached to the battery duration rather than the drawing processing capacity.

On the other hand, with regard to a desk top type PC, where it has an expansion slot, it is conventionally possible to connect an extension board called graphic board (video card or video board) to the extension slot to perform exchange or addition of a graphic board.

However, in this instance, professionally high knowledge is required for exchange between a plurality of graphics chips, and therefore, a graphics chip cannot be exchanged readily. Further, in order to exchange a graphics board, it is necessary to perform complicated operations such as to open a case of a desk top type PC and remove and insert a graphic board, which is not convenient to the user as well.

It is to be noted that, as regards changeover between two different graphics chips, a graphic apparatus is disclosed in Japanese Patent Laid-Open No. Hei 11-353495, particularly in paragraph [0009] and FIG. 1 etc. (hereinafter referred to as Patent Document 1). The graphic apparatus includes a controller for a 2D graphics process and a controller for a 3D graphics process, and a changeover circuit capable of changing over between the controllers in response to a type of a drawing command, mounted on one board. The information processing apparatus can change over a controller to be used between the two controllers in response to a drawing command from an application for a 2D process and a 3D process.

However, in the graphic apparatus disclosed in Patent Document 1, the controllers are merely selectively used in response to the drawing command from the application. However, the graphic apparatus does not allow the user to actively change over the controller to be used between the controllers in response to such a demand of the user that, for example, importance be attached to one of the drawing processing capacity and lower power consumption or an object of use of the user.

From such a situation as described above, it is demanded to provide an information processing apparatus, an information processing method and a program by which a graphics chip to be used can be changed over readily between graphics chips having different information processing capacities in response to an object of use of a user.

SUMMARY OF THE INVENTION

According to a preferred embodiment of the present invention, there is provided an information processing apparatus including a first graphics chip having a first drawing processing capacity and being capable of producing a first image signal; a second graphics chip having a second drawing processing capacity higher than the first drawing processing capacity and being capable of producing a second image signal; an output changeover section capable of selectively outputting one of the first or second image signals; an inputting section configured to input a user operation to select one of the first graphics chip or the second graphics chip; and a control section configured to control the output of the output changeover section in response to the inputted user operation.

In the information processing apparatus, the graphics chip to be used can be changed over between graphics chips having different processing capacities from each other in response to a selection by the user and, consequently, a process conforming to an object of utilization of the information processing apparatus by the user can be carried out readily. For example, when the user wants the information processing apparatus to perform a task for which a high drawing processing capacity is required, such as reproduction of moving pictures of high picture quality, the second graphics chip is used, but when the user wants to suppress the power consumption to extend the battery duration, the first graphics chip is used. In this manner, both a high performance and a low power consumption can be achieved. Further, since the graphics chip to be used is selectively changed over in order to change over the performance in this manner, the user can intuitively use the graphics chips without being aware of the fact that a plurality of graphics chips are incorporated.

Here, the drawing processing capacity includes whether the drawing processing speed (operation clock number) or the resolution is high or low, whether the information processing apparatus has a function of producing complicated visual effects, and so forth. Further, the information processing apparatus may be a computer (where this is a PC, it may be of the desk-top type or of the notebook type), a PDA (Personal Digital Assistant), an audio/visual apparatus, a portable telephone set, a game machine or the like. Meanwhile, although the inputting section may be implemented using a software switch, preferably it is formed from a mechanical switch such as, for example, a slide switch.

The information processing apparatus may be configured such that the control section stops power supply to the one of the graphics chips which has not been selected by the user.

With the information processing apparatus, useless power supply to the graphics chip which is not being used can be stopped, and therefore, further reduction in power consumption can be achieved.

In this instance, the information processing apparatus may be configured such that the control section includes a detection section configured to detect a starting event of the information processing apparatus; a supplying section configured to supply power to the first and second graphics chips if the starting event is detected by the detection section; and a stopping section configured to stop the power supply to the one of the graphics chips which has not been selected by the user.

With the information processing apparatus, since power is supplied to the first or second graphics chip and the power supply to one of the graphics chips is stopped, when the information processing apparatus is to be started, a situation can be avoided in which a voltage is applied to one of the graphics chips while no power is being applied to the graphics chip and consequently the graphics chip is damaged or broken.

Or, the information processing apparatus may be configured such that the control section includes a detection section configured to detect a re-starting event of the information processing apparatus; a supplying section configured to supply power to the first and second graphics chips if the re-starting event is detected by the detection section; and a stopping section configured to stop the power supply to the one of the graphics chips which has not been selected by the user.

With the information processing apparatus, since the power supply to the first or second graphics chip is controlled while a re-starting event of the information processing apparatus is detected, a situation can be avoided in which, upon re-starting of the information processing apparatus, a voltage is applied to one of the graphics chips while no power is being applied to the graphics chip, thereby damaging or breaking down the graphics chip.

In this instance, the information processing apparatus may be configured such that, if the selection of one of the graphics chips is changed by the inputting section while the information processing apparatus is in a started state, then the control section causes display of a screen which urges the user to re-start the information processing apparatus.

Where the information processing apparatus does not support a change of a graphics chip while the OS is operating, it is necessary to re-start the information processing apparatus in order to carry out the change. Also in this instance, thanks to the configuration described above, since the user is urged to re-start the information processing apparatus, the information processing apparatus can change over the graphics chip with safety and can be prevented from being re-started inadvertently without permission of the user by a change of the graphics chip.

The information processing apparatus may further include a notification section configured to issue a notification of which one of the graphics chips has been selected by the user.

With the information processing apparatus, the user can confirm readily which one of the graphics chips has been selected.

In this instance, the information processing apparatus may be configured such that the notification section is an LED display section configured to issue a notification of which one of the graphics chips has been selected by lighting of an LED.

With the information processing apparatus, where the LED is lit, the user can confirm the selected graphics chip at a glance.

The information processing apparatus may further include a fan configured to radiate heat generated in the information processing apparatus, the control section being configured, based on the user operation, to set the speed of rotation of the fan to a first speed of rotation when the first graphics chip has been selected and set the speed of rotation of the fan to a second speed of rotation higher than the first speed of rotation when the second graphics chip has been selected.

With the information processing apparatus, if the user wants to attach importance to low noise generation of the information processing apparatus, noise generated by rotation of the fan can be reduced through selection of the first graphics chip.

The information processing apparatus may further include a CPU configured to control operation of the entire information processing apparatus, the control section being configured, based on the user operation, to set an operation clock number of the CPU to a first clock number when the first graphics chip has been selected and to set the operation clock number of the CPU to a second clock number higher than the first clock number when the second graphics chip has been selected.

With the information processing apparatus, if the first graphics chip which exhibits low power consumption is selected, then also the operation clock number of the CPU decreases, and consequently, the low power consumption effect can be further enhanced. On the contrary, if the second graphics chip which has a high drawing processing capacity is selected, then also the operation clock number of the CPU increases. Consequently, the performance of the information processing apparatus can be utilized to the utmost.

The information processing apparatus may further include a power saving section configured to place the information processing apparatus into a power saving mode, the control section being configured, when the information processing apparatus is placed in the power saving mode, to store information regarding the selection state of the graphics chips by the user and, when the information processing apparatus returns from the power saving mode, to cause the output changeover section to output an image signal from the graphics chip selected before the placement into the power saving mode based on the stored information.

The power saving mode here is a standby (suspended) mode or a rest mode (hibernation). With the information processing apparatus, when it returns from the power saving mode, the graphics chip selected prior to the returning is selected irrespective of a user operation. Therefore, even when the OS of the information processing apparatus does not recognize a change of selection of the graphics chip by a user operation upon returning, the appropriate graphics chip can be selected to achieve safe returning.

According to another embodiment of the present invention, there is provided an information processing apparatus which operates with power supplied from one of an AC adapter or a battery, including a first graphics chip having a first drawing processing capacity and being capable of producing a first image signal; a second graphics chip having a second drawing processing capacity higher than the first drawing processing capacity and being capable of producing a second image signal; an output changeover section capable of selectively outputting one of the first or second image signals; a detection section configured to detect from which one of the AC adapter or the battery the information processing apparatus is supplied with the power; and a control section configured to control the output changeover section based on a result of the detection by the detection section such that the first image signal is output when the information processing apparatus is supplied with power from the battery and the second image signal is output when the information processing apparatus is supplied with power from the AC adapter.

With the information processing apparatus, it can be detected from which one of an AC adapter or a battery the power is received, and an appropriate one of the graphics chips can be selected to perform a drawing process in response to an object of utilization of the user without forcing the user to perform an explicit selection operation. For example, one of the graphics chips may be selected by the user depending upon whether importance should be attached to operability with a high drawing processing capacity or to the battery duration.

According to a further embodiment of the present invention, there is provided an information processing method including outputting one of a first image signal output from a first graphics chip having a first drawing processing capacity or a second image signal output from a second graphics chip having a second drawing processing capacity higher than the first drawing processing capacity; inputting a user operation to select one of the first graphics chip or the second graphics chip; and controlling the outputting step to output the first image signal or the second image signal in response to the inputted user operation.

According to a still further embodiment of the present invention, there is provided an information processing method which is performed by an information processing apparatus which can operate with power supplied from one of an AC adapter or a battery, the method including a first image signal output from a first graphics chip having a first drawing processing capacity or a second image signal output from a second graphics chip having a second drawing processing capacity higher than the first drawing processing capacity; detecting from which one of the AC adapter or the battery the information processing apparatus is supplied with the power; and based on a result of the detection, controlling the outputting step to output the first image signal when the information processing apparatus is supplied with power from the battery and to output the second image signal when the information processing apparatus is supplied with power from the AC adapter.

According to a yet further embodiment of the present invention, there is provided a program for causing an information processing apparatus to execute an information processing method, the method including outputting one of a first image signal output from a first graphics chip having a first drawing processing capacity or a second image signal output from a second graphics chip having a second drawing processing capacity higher than the first drawing processing capacity; inputting a user operation to select one of the first graphics chip or the second graphics chip; and controlling the outputting step to output the first image signal or the second image signal in response to the inputted user operation.

According to a yet further embodiment of the present invention, there is provided a program for causing an information processing apparatus, which can operate with power supplied from one of an AC adapter or a battery, to execute an information processing method, the method including outputting one of a first image signal output from a first graphics chip having a first drawing processing capacity or a second image signal output from a second graphics chip having a second drawing processing capacity higher than the first drawing processing capacity; detecting from which one of the AC adapter or the battery the information processing apparatus is supplied with the power; and based on a result of the detection, controlling the outputting step to output the first image signal when the information processing apparatus is supplied with power from the battery and to output the second image signal when the information processing apparatus is supplied with power from the AC adapter.

In summary, with the information processing apparatus and methods and the programs, the graphics chip to be used can be changed over readily between graphics chips having different drawing processing capacities from each other in response to an object of utilization of the user.

The above and other features and advantages of the present invention will become apparent from the following description and the appended claims, taken in conjunction with the accompanying drawings in which like parts or elements are denoted by like reference symbols.

DETAILED DESCRIPTION

Figure 1:
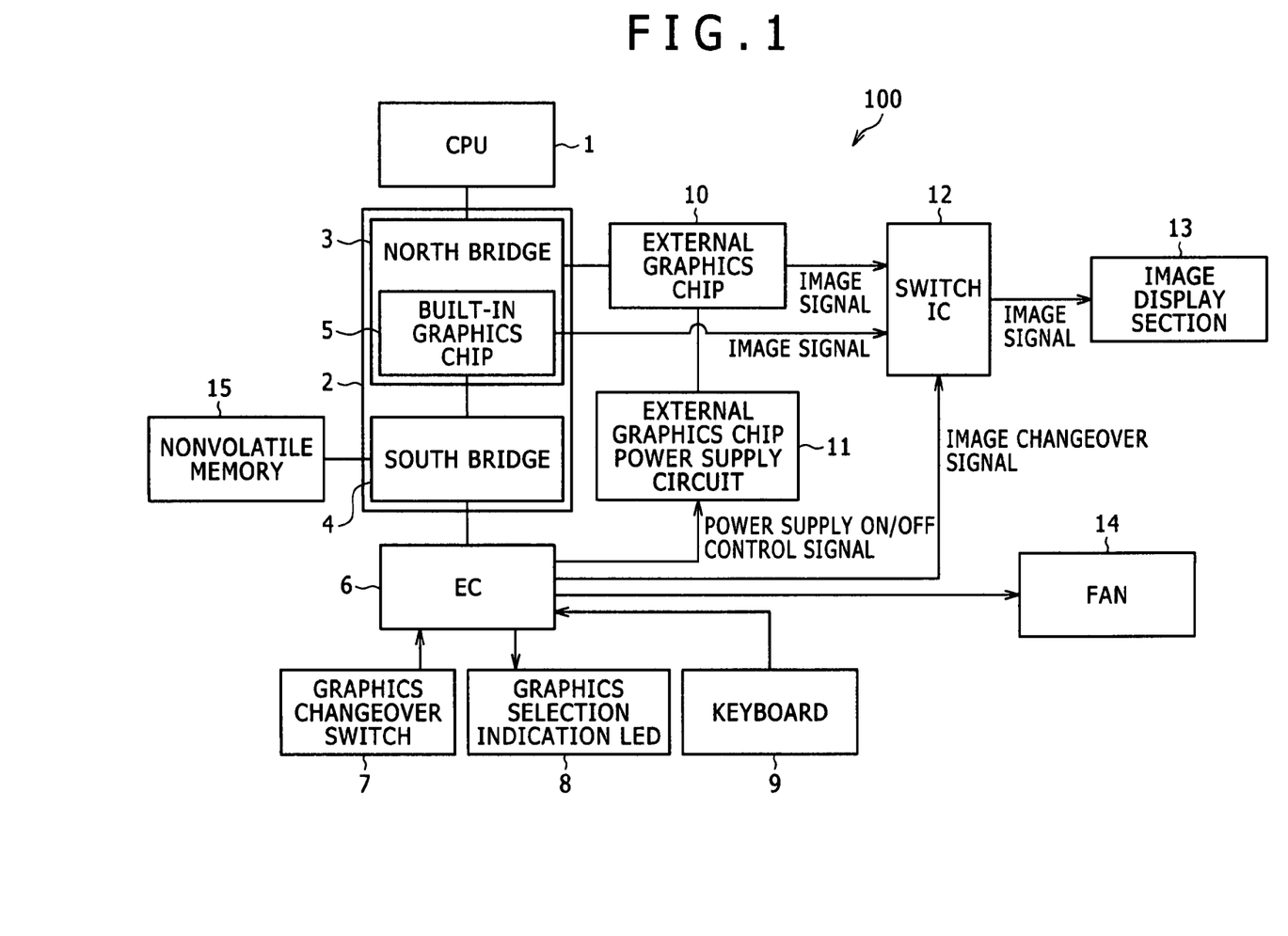
FIG. 1 is a block diagram showing a hardware configuration of a notebook type PC to which the present invention is applied.
Figure 8:
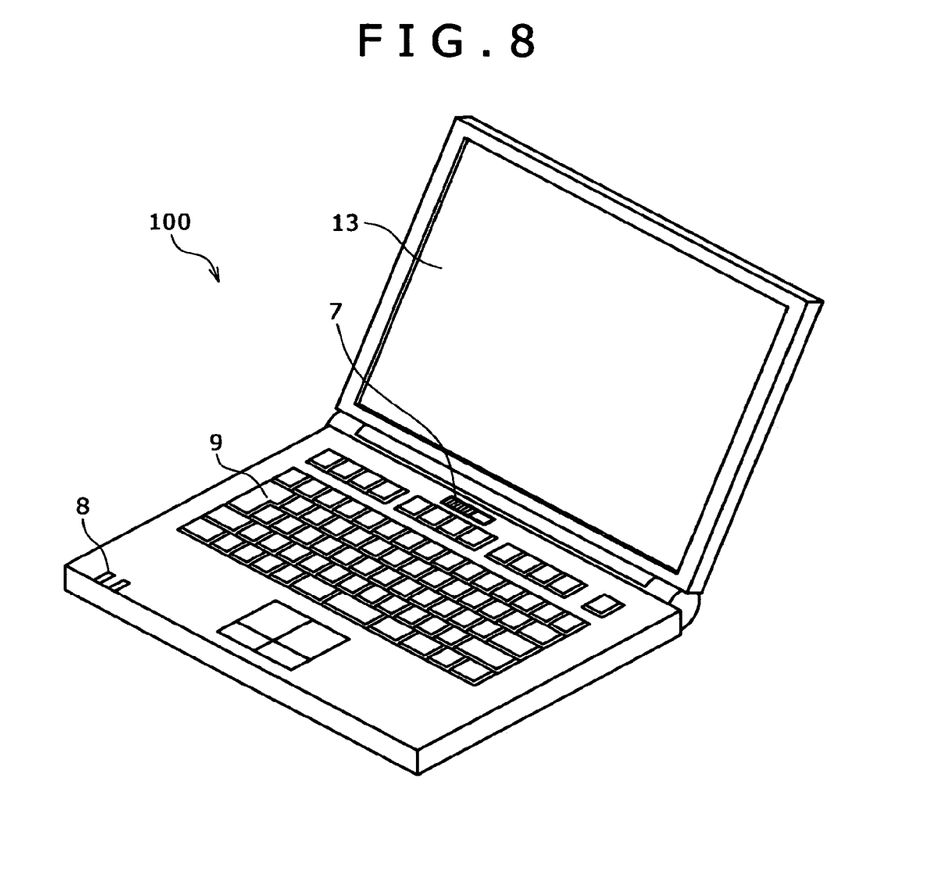
FIG. 8 is a perspective view showing an appearance of the notebook type PC.

A preferred embodiment of the present invention is described below with reference to the accompanying drawings. FIG. 1 shows a hardware configuration of a notebook type personal computer (PC) 100 to which the present invention is applied. Meanwhile, FIG. 8 shows an appearance of the notebook type PC 100 of FIG. 1.

Referring first to FIG. 1, the notebook type PC 100 shown includes a chip set 2 for managing transfer of data between devices in the inside of the notebook type PC 100. The chip set 2 includes a north bridge 3 and a south bridge 4.

The north bridge 3 includes a built-in graphics chip 5, a memory controller not shown and other elements not shown built therein. The north bridge 3 is connected to a central processing unit (CPU) 1 and an external graphics chip 10. The south bridge 4 has connection interfaces with peripheral devices such as a nonvolatile memory 15 and an EC 6.

The built-in graphics chip 5 and the external graphics chip 10 perform a drawing process based on data received from the CPU 1 and output a resulting image signal to a switch IC 12 so as to be displayed on an image display section 13. In the present embodiment, the external graphics chip 10 has a higher drawing processing capacity than the built-in graphics chip 5.

Although the built-in graphics chip 5 has a lower drawing processing capacity than the external graphics chip 10, the power consumption thereof is low. On the other hand, while the external graphics chip 10 has a higher drawing processing capacity in a 3D process, a high resolution drawing process and so forth, since it drives itself and peripheral devices, the power consumption thereof is high. Also the power load of the notebook type PC 100 with respect to the entire system is high.

In the present embodiment, the built-in graphics chip 5 and the external graphics chip 10 which have different drawing processing capacities as just described can be selectively used to perform a drawing process.

The nonvolatile memory 15 may be formed from, for example, a ROM (Read Only Memory), an EEPROM (Electrically Erasable and Programmable Read Only Memory), a flash memory or some other memory.

The EC 6 has three different functions including a KBC (Keyboard Controller) function for controlling a keyboard 9, an ACPI/EC function for managing the power supply in compliance with the ACPI (Advanced Configuration and Power Interface) standards for power control and a PIC (Programmable IO Controller) function for providing an interface with utility software hereinafter described.

The EC 6 can detect a depression operation of the keyboard 9 by the KBC function thereof and issue a notification of information called scan code to a higher order system such as an OS (Operating System). Further, the EC 6 has an interface for communication with such a system as an OS or a BIOS hereinafter described and can transmit and receive a command and data.

The EC 6 is connected to a graphics changeover switch 7, a graphics selection indication LED (Light Emitting Diode) 8, an external graphics chip power supply circuit 11, and a fan 14.

The graphics changeover switch 7 is operable by a user to select one of the built-in graphics chip 5 and the external graphics chip 10 which is to be used. Referring to FIG. 8, the graphics changeover switch 7 is provided as a mechanical switch such as, for example, a slide switch at an upper portion of the keyboard 9. For selection of the built-in graphics chip 5 or the external graphics chip 10, the graphics changeover switch 7 may be incorporated otherwise such that, for example, application software, utility software or like software provided in the notebook type PC 100 is used such that the graphics changeover switch 7 is provided as a switch on a GUI (Graphical User Interface). In this instance, however, operation including a plurality of steps of finding out pertaining application software, starting the application software and performing an inputting operation for changing over the graphics chip is required, and also knowledge of a high grade is required. In the present embodiment, since such a mechanical switch as described above is used as the graphics changeover switch 7, the user can select a graphics chip without performing complicated operations.

The graphics selection indication LED 8 is provided to notify, when it is lit, the user of which one of the graphics chips is selected by the graphics changeover switch 7. The graphics selection indication LED 8 is provided, for example, on the front face side of the notebook type PC 100 as seen in FIG. 8. For example, the graphics selection indication LED 8 includes two LED indication elements such that one of them which corresponds to the selected graphics chip is lit. According to one of conventional methods for confirming which one of graphics chips is selected, such lighting is performed from a device manager on the Microsoft Windows (registered trademark) XP which is a popular OS. However, in order to open the device manager, a plurality of such complicated steps as steps of starting the "control panel", selectively executing the "device", selecting the "device manager" from the "hardware" tab and selecting the "display adapter" on tree-like display are required. Such complicated steps are quite unfamiliar to general users. Therefore, in the present embodiment, such a display function like that of an LED described above is incorporated so that such confirmation as described above can be visually recognized readily without any operation.

The external graphics chip power supply circuit 11 is provided to change over the power supply to the external graphics chip 10 between supplying and non-supplying states in accordance with a power supply ON/OFF control signal outputted from the EC 6 by the ACPI/EC function described hereinabove. In particular, when the built-in graphics chip 5 is to be used, the function of the external graphics chip 10 is disabled while power supply to the external graphics chip 10 and peripheral circuits of the same is stopped by the external graphics chip power supply circuit 11 so that the power consumption of the entire notebook type PC 100 can be suppressed.

The fan 14 is provided to radiate heat generated from the CPU 1 and other components of the notebook type PC 100. The EC 6 controls also driving of the fan 14 in response to the selection condition of the graphics chips. In particular, when the built-in graphics chip 5 is selected, the speed of ration of the fan 14 is lowered when compared with that when the external graphics chip 10 is selected. Consequently, the fan 14 can be controlled suitably in response to the selected graphic chip.

The switch IC 12 outputs an image signal selectively outputted from one of the built-in graphics chip 5 and the external graphics chip 10 to the image display section 13. The EC 6 outputs an image changeover signal to the switch IC 12 in response to the selection condition of the graphics chips so as to control changeover between image signals outputted from the graphic chips.

The image display section 13 is, for example, a liquid crystal display panel built in the notebook type PC 100 shown in FIG. 8. However, various other consoles such as, for example, a TV (television) set and a CRT (Cathode Ray Tube) externally connected to the notebook type PC 100 may be used as the image display section 13. In the present embodiment, not different display sections are provided individually for the built-in graphics chip 5 and the external graphics chip 10, but a common display section is used and controlled by the EC 6 to perform changeover between image signals in response to the image changeover signal mentioned hereinabove outputted to the switch IC 12. Use of such common display section is particularly useful in design of small size apparatus for which space-saving design is required like a notebook type PC.

It is to be noted that, though not shown in the drawings, the notebook type PC 100 has additional functions and devices necessary for a computer such as an external storage apparatus such as a hard disk drive (HDD) and interfaces such as various buses and terminals.

In this manner, in the present embodiment, a microcomputer for changing over the graphics chips is not incorporated, but the EC 6, which is conventionally incorporated in a notebook type PC in order to control a key board and the power supply, is used to implement changeover between the graphics chips. Consequently, the requirement for an additional cost, expansion of the board area and occurrence of power consumption can be suppressed.

Figure 2:
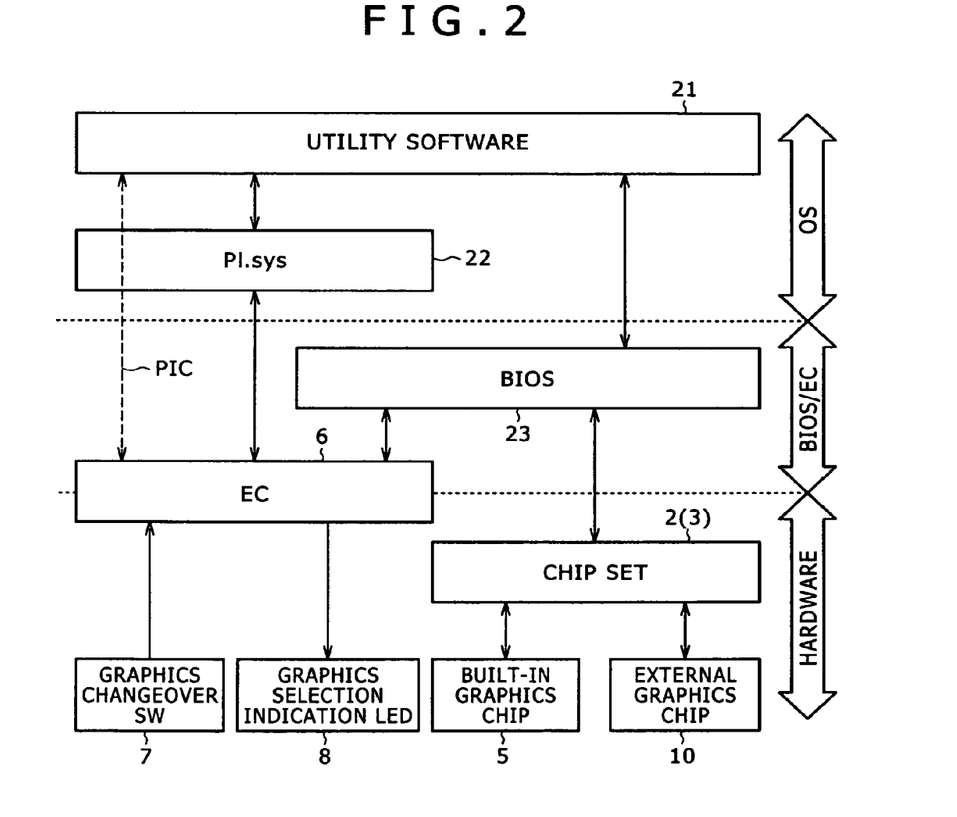
FIG. 2 is a block diagram showing a layer configuration of software and hardware of the notebook type PC.

Now, software provided in the notebook type PC 100 is described. FIG. 2 illustrates a layer configuration of software and hardware of the notebook type PC 100.

Referring to FIG. 2, the notebook type PC 100 includes software hierarchically incorporated on such hardware as the chip set 2 (north bridge 3), the built-in graphics chip 5 and the external graphics chip 10 connected to the chip set 2, the graphics changeover switch 7 and the graphics selection indication LED 8. The software includes a BIOS 23, and utility software 21 and PI.sys 22 which operate on the OS. The EC 6 plays a role as an interface between the hardware and the software.

The utility software 21 makes up for functions which the OS and other application software have in order to enhance the functions, performances and operability.

The PI.sys 22 is software for bridging the utility software 21 which operates on the OS and the EC 6 and is used to utilize the PIC described hereinabove. In particular, communication which uses the PIC between the EC 6 and the utility software 21 is performed through the PI.sys 22. Further, although the PIC passes the PI.sys 22 on the route thereof, intuitively the EC 6 and the utility software 21 can communicate directly with each other.

The BIOS 23 is software for performing initialization and testing of the devices immediately after the power supply to the notebook type PC 100 is made available. Further, the BIOS 23 performs also initialization of the graphics chips before the OS starts.

More particularly, the BIOS 23 has a program built therein for performing a process called POST (Power On Self Test) until the control right is passed to the OS side such as the Windows (registered trademark) after the system is started. It is a principal object of the POST to automatically execute a test of the pertaining blocks when the power supply to the notebook type PC 100 is made available to check that the hardware such as the graphics chips, the memories and the disks is normal, but also initialization of the graphics chips is performed simultaneously. In other words, also it is a role of the BIOS 23 in the present embodiment to appropriately initialize the selected graphics chip and appropriately disable the other graphics chip which is not selected.

As seen in FIG. 2, the BIOS 23 has a communication interface with the EC 6. The BIOS 23 requests the EC 6 to issue an instruction to turn ON/OFF the graphics selection indication LED 8, to change over the display from the external graphics chip 10 to the built-in graphics chip 5, to turn ON/OFF the power supply circuit 11 of the external graphics chip 10 and acquire the state of the graphics changeover switch 7.

Incidentally, the Windows (registered trademark) which is a popular OS at present incorporates a function to enter a power saving mode called standby (suspended) or rest mode (hibernation). In the standby mode, many devices exhibit a reset state, but stored contents of memories are maintained. On the other hand, in the rest mode, the stored contents of the memories are saved into the HDD and the system is in a power off state.

Further, in the Windows (registered trademark), such a situation that different graphics chips are used before and after any of such power saving modes is entered. Therefore, even if, in such a situation as just described, the user operates the graphics changeover switch 7 to issue a request to change over the graphic chip to be used, such changeover of the graphic chip must be avoided. Therefore, in the present embodiment, within a process of entrance into the power saving mode, the BIOS 23 stores the currently selected graphic chip into the nonvolatile memory 15, and then upon recovery, the BIOS 23 selects the graphic chip selected prior to the recovery irrespective of the state of the graphics changeover switch 7.

Now, hardware control of the notebook type PC 100 is described in detail.

Since a general OS at present such as the Windows (registered trademark) described above does not support the hot-plug/unplug feature of a graphics chip in operation, for example, while the Windows (registered trademark) XP is operating, changeover of the graphics chip is not permitted. Accordingly, in the present embodiment, changeover of the graphics chip is performed before the OS is started, and from this, if a changeover request of the graphics chip is issued after the OS is started, then re-starting of the OS is performed.

Further, as described hereinabove, in the present embodiment, the power supply to the external graphics chip 10 can be stopped by the external graphics chip power supply circuit 11. However, if a voltage is applied between the terminals of the external graphics chip 10 to which no power is supplied, then such a problem as breakdown of a terminal of an IC or leakage of current through the external graphics chip 10 occurs. In order to prevent such problems, in the present embodiment, cancellation of resetting of the system is performed in a state wherein power is supplied to the external graphics chip 10 so that no problem may occur even if a voltage is applied between the terminals of the external graphics chip 10. Then, after an appropriate process is performed so that no voltage may be applied between the terminals of the external graphics chip 10, if the built-in graphics chip 5 is selected, then the power supply to the external graphics chip 10 is stopped. It is to be noted that, in the present embodiment, since the built-in graphics chip 5 is built in the chip set 2, the power supply to the built-in graphics chip 5 is not stopped during operation of the notebook type PC 100. Details of the control process of the external graphics chip power supply circuit 11 are hereinafter described.

Further, if the system is reset, then since also a device connected to the external graphics chip 10 is reset, there is the possibility that a voltage may be applied between the terminals of the external graphics chip 10. If a voltage is applied between the terminals of the external graphics chip 10 while no power is supplied to the external graphics chip 10, then such a problem as breakdown of a terminal or leakage of current through the graphics chip occurs as described above. Therefore, it is necessary to detect, when resetting of the system occurs, the resetting and then supply power to the external graphics chip 10 or perform a process for preventing a voltage from being applied to a signal connecting to the external graphics chip 10 before the system resetting is canceled. Therefore, in the present embodiment, the EC 6 performs detection of occurrence of a re-starting (re-booting) event and cancellation of the system resetting (platform resetting). After the EC 6 detects the system resetting and power is supplied to the external graphics chip 10 under the timing control of the EC 6, the system resetting is canceled thereby to allow a system starting process to be started. In the present specification, this mechanism of the EC 6 is referred to as "reset trap". The reset trap is described in detail below.

Figure 3:
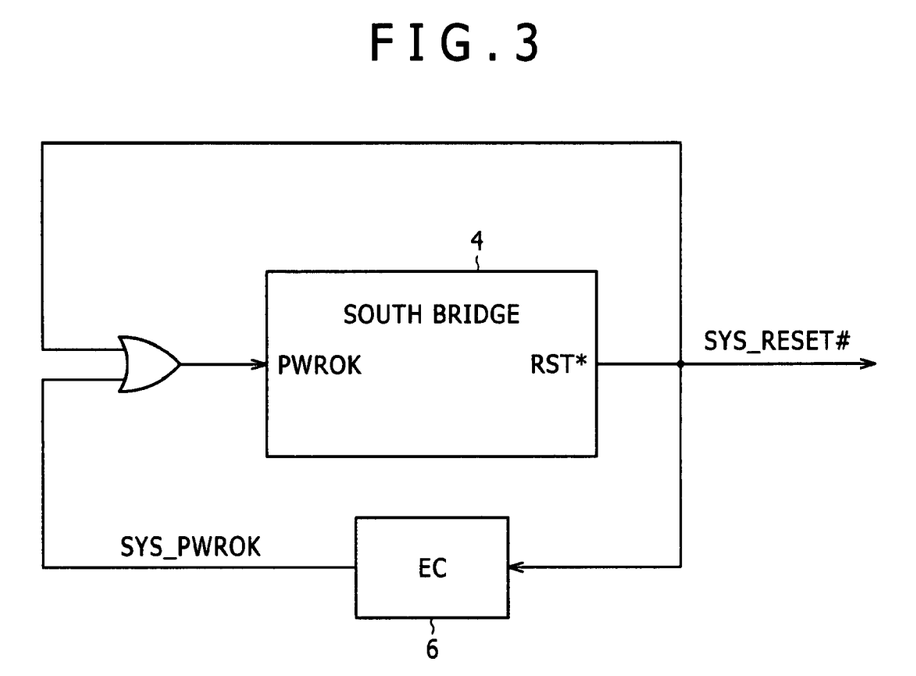
FIG. 3 is a block diagram showing a reset trap mechanism of an EC of the notebook type PC.

FIG. 3 shows the reset trap mechanism of the EC 6. Usually in a PC, control of a system reset signal is performed by a south bridge of a chip set. An input terminal denoted by PWROK in FIG. 3 is used by the south bridge 4 to receive a notification that power is supplied normally to devices which compose the system and consequently preparations for performing cancellation of the system resetting signal (SYS_RESET#) are made. If this terminal is asserted, then execution of a power up sequence is started in the inside of the south bridge 4, and the system resetting signal SYS_RESET# is cancelled finally. Conversely speaking, cancellation of the system resetting signal SYS_RESET# is not performed as long as the signal at the terminal PWROK is Low.

Since originally the control subject of the system resetting signal SYS_RESET# is the south bridge 4, there is a problem that, if the system resetting signal SYS_RESET# is controlled independently of the south bridge 4, then the south bridge 4 cannot detect that the other devices are reset.

Therefore, in the present embodiment, the system resetting signal SYS_RESET# which is an output signal of the chip set 2 (south bridge 4) and a SYS_PWROK signal which is an output signal of the EC 6 are inputted to the PWROK terminal of the chip set 2 (south bridge 4) through an OR gate. Consequently, the system resetting can be cancelled (deasserted) at a timing managed by the EC 6 with the SYS_PWROK signal.

In the present embodiment, cancellation of the system resetting is performed with the pulse signal SYS-PWROK which changes to the Low level after the system resetting signal SYS_RESET# changes to the High level. In particular, also after the EC 6 changes the SYS_PWROK signal to the Low level, since the system resetting signal SYS_RESET# remains at the High level, the PWROK terminal of the south bridge 4 is maintained at the High level. Upon re-starting of the system or the like, if a system resetting signal is applied (SYS_RESET#=Low) after resetting of the system is cancelled, then since the PWROK terminal of the chip set 2 (south bridge 4) changes to the Low level, an output terminal (RST*) of the system reset signal is kept at the Low level until the EC 6 changes the SYS_PWROK signal to the High level. By inputting the system reset signal to the terminal of the EC 6, the EC 6 can detect that the system reset signal is asserted, and while the system reset signal remains at the Low level, the EC 6 performs necessary processing. Thereafter, cancellation of the system resetting is permitted. This mechanism is the reset trap mentioned hereinabove.

Now, details of the control of the external graphics chip power supply circuit 11 are described.

As described hereinabove, when the built-in graphics chip 5 whose power consumption is low operates, no power is supplied to the external graphics chip 10 and those ICs which are used only when the external graphics chip 10 operates as well as peripheral circuits to the ICs. Consequently, low power consumption operation of the entire system can be achieved. However, if the system is re-started in the state wherein no power is supplied to the external graphics chip 10 and is then reset, then the following problem occurs.

When the system is reset, devices connected to the graphics chips are reset, and consequently, a voltage is applied between the terminals of the graphic chips. For example, where the external graphics chip 10 is a recently available external graphics chip, although it has an interface called PCI Express for the connection to the chip set 2, if the system is reset, then the chip set 2 (north bridge 3) is reset and then drives a PCI Express signal. Consequently, a voltage is applied between the terminals of the external graphics chip 10. In order to prevent the chip set 2 (north bridge 3) from driving the PCI Express signal, it is necessary to invalidate the PCI Express interface of the chip set 2 (north bridge 3) by the BIOS 23. However, in order for the BIOS 23 to operate, the system resetting must be cancelled. Therefore, the PCI Express interface of the chip set 2 (north bridge 3) cannot be invalidated while the system is in a reset state.

Therefore, in order to prevent a voltage from being applied between the terminals of the external graphics chip 10 while no power is supplied to the external graphics chip 10, when the system is reset, the reset trap mechanism for allowing the EC 6 to detect such resetting is required. Before the system resetting is cancelled, power supply to the external graphics chip 10 is performed, and then after the time resetting is cancelled, the power supply to the external graphics chip 10 is stopped after necessary processing such as invalidation of the PCI Expression interface of the chip set 2 (north bridge 3) is performed. Since trapping and cancellation of the system resetting can be performed under the control of the EC 6 by the reset trap mechanism, as the EC 6 performs control of the power supply to the external graphics chip 10, cancellation of the system resetting, which is originally controlled by the chip set 2, can be performed after power supply to the external graphics chip 10 is performed.

Now, control of a signal connected to a terminal of the external graphics chip 10 is described. Principal signals connected to terminals of the external graphics chip 10 from other ICs include a reset signal, a clock, signals of buses (PCI Express, AGP sand so forth) which interconnect the external graphics chip 10 and the chip set 2 and an image signal. As described hereinabove, while no power is supplied to the external graphics chip 10, it is necessary for the signals mentioned to be kept from being driven to the High level. However, since the reset signal is an Active Low signal, when the system operates normally, the reset signal is driven to the High level. On the other hand, the clock, the PCI Express signal and so forth normally repeat changeover between the High level and the Low level.

Therefore, where ON/OFF of the power supply to the external graphics chip 10 is controlled from the EC 6, a power supply control signal produced from a bus switch or a gate IC is used to mask the signals so that the signals are prevented from being driven while no power is supplied to the external graphics chip 10.

Although logic signals such as the reset signal can be processed readily by interposing a logic gate, where a gate IC or a bus switch IC is used, it is not preferable to use a switch IC to cut a high speed signal from the point of view of the signal quality. Further, where many signals are controlled by a switch IC, particularly in the case of a small-sized apparatus such as the notebook type PC 100, the switch IC provides a significant restriction to the design from the point of view of space-saving design. For example, the graphics chip connected to the chip set 2 by the PCI Express interface is connected normally by 16 PCI Expression lanes. Since one lane is formed from four signal lines, totaling 64 high speed signals must be ON/OFF controlled by switches.

However, if the reset trap mechanism described above is used, then such restriction is cancelled. As regards the clock, where the clock is supplied from an oscillator having a terminal for ON/OFF control of the clock, the terminal for the clock ON/OFF control is controlled from the built-in graphics chip 5 to achieve ON/OFF control of the clock at an appropriate timing. On the other hand, where the oscillator does not have such a terminal as described above, the power supply to the external graphics chip 10 can be turned off after the clock is turned off by performing register setting of the oscillator by means of the BIOS 23 or the like after the system resetting is canceled. As regards the PCI Express signals, for example, where a chip set of Intel (registered trademark) is used, the interface can be invalidated by setting to a register. Therefore, the power supply to the external graphics chip 10 can be turned off after the BIOS 23 performs setting to the register so as to block the PCI Express signal from being driven after the system resetting is cancelled.

Also it can be supposed that, since the external graphics chip 10 has a high drawing capacity when compared with the built-in graphics chip 5, it may be connected to an external monitor as the image display section 13 in conformity with, for example, the DVI (Digital Visual Interface). After the external graphics chip 10 is connected to an external monitor, when changeover from the external graphics chip 10 to the built-in graphics chip 5 is to be performed, there is the possibility that electric current may flow back to the external graphics chip 10, to which the power supply is stopped by the changeover, from the external monitor or a neighboring IC. Therefore, in the present embodiment, a current backflow preventing mechanism is provided to prevent breakdown of the external graphics chip 10.

In particular, the backflow preventing mechanism is implemented, for example, by interposing a switch formed from a diode or a transistor between the external graphics chip 10 and an external image output terminal such that the switch is switched off when it is detected that no power is supplied to the external graphics chip 10. Alternatively, the EC 6 may be used to control the signal between the external graphics chip 10 and the external image output terminal.

Now, operation of the notebook type PC 100 having the configuration described above is described. As described hereinabove, in the present embodiment, selection of a graphics chip is performed upon starting of the notebook type PC 100 and upon system resetting.

Figure 4:
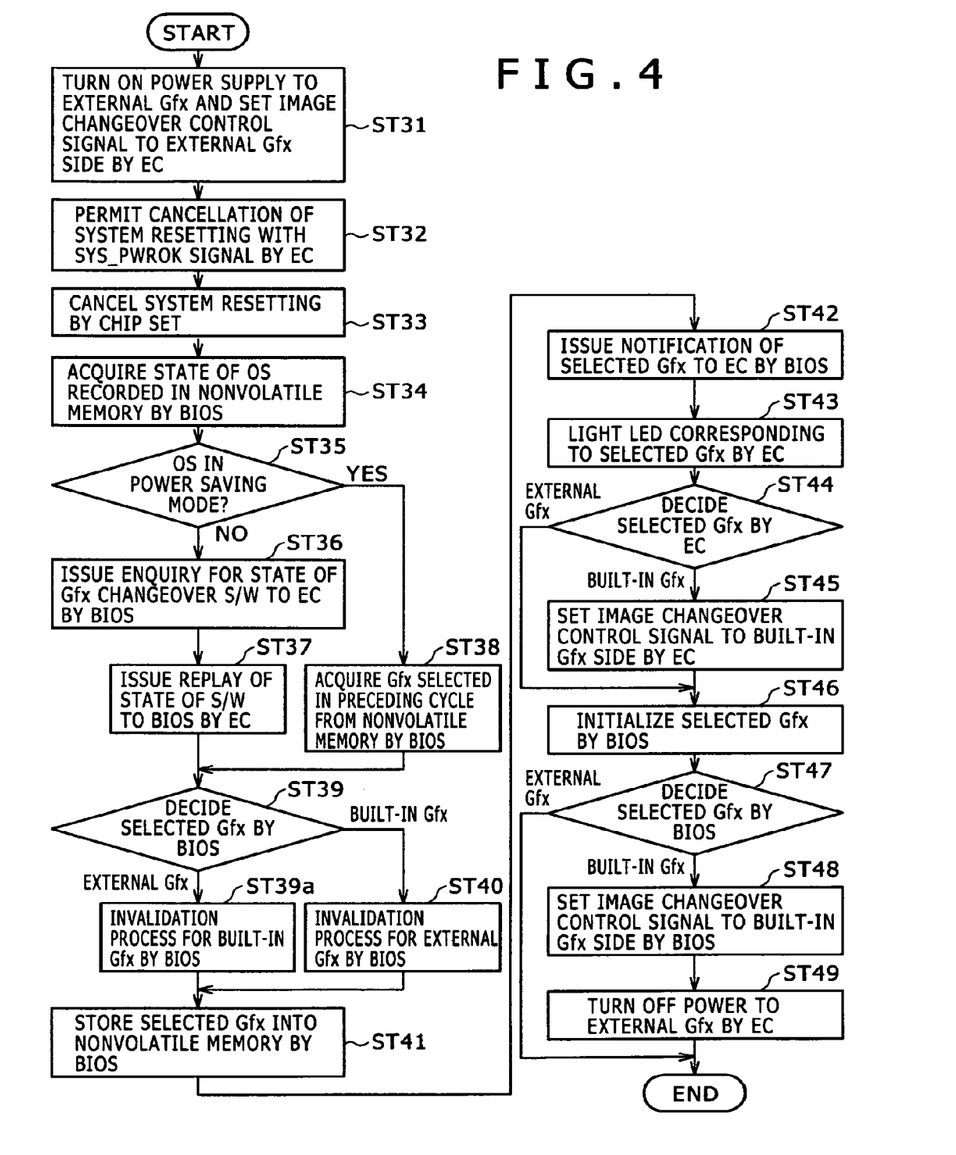
FIG. 4 is a flow chart illustrating a flow of a graphics chip selection process executed upon starting of the notebook type PC.
Figure 5:
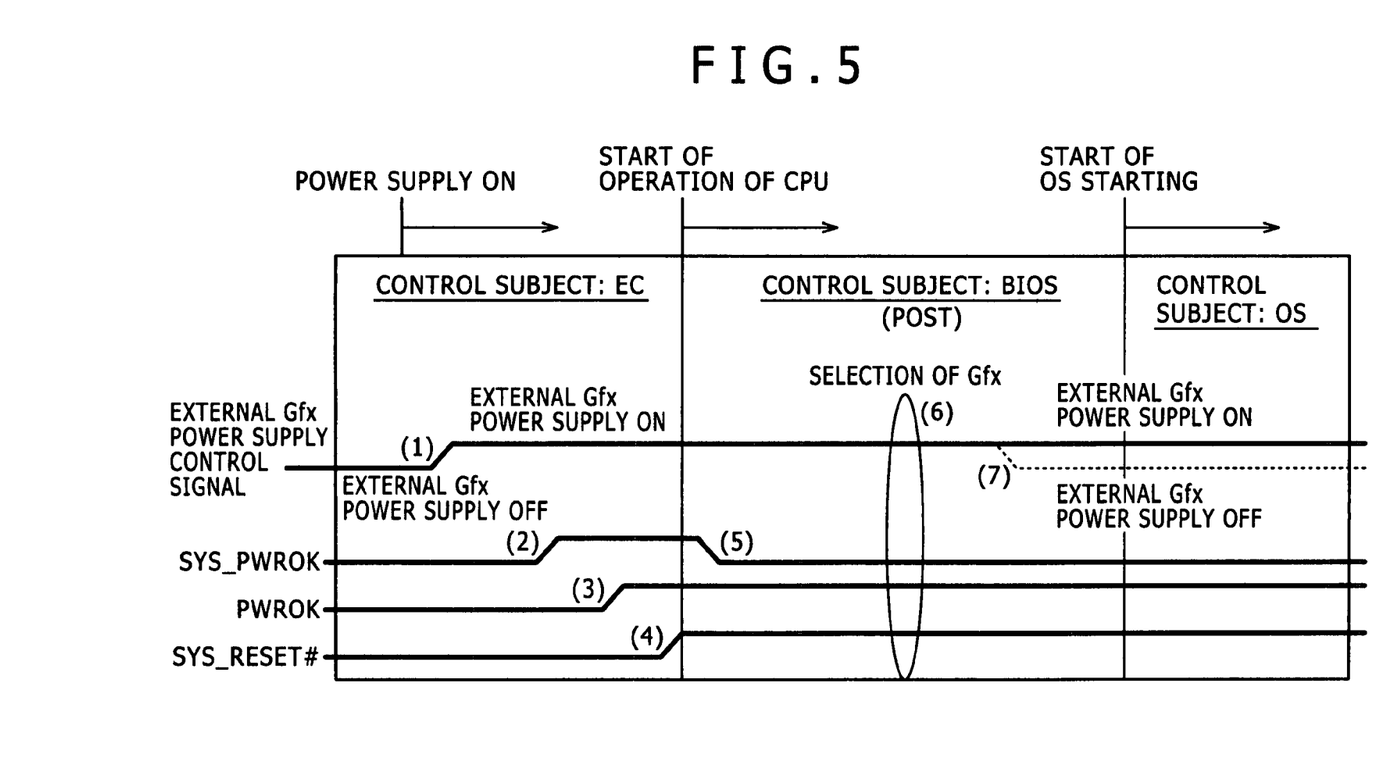
FIG. 5 is a timing chart of signals of the notebook type PC in the graphics chip selection process illustrated in FIG. 4.

First, a selection process of a graphics chip upon starting of the notebook type PC 100 is described. FIG. 4 illustrates a flow of a graphics chip selection process upon starting of the notebook type PC 100, and FIG. 5 illustrates signals in the graphics chip selection process. It is to be noted that, in FIGS. 4 to 7, the "graphics chip" is referred to simply as "Gfx".

Referring to FIGS. 4 and 5, after power is made available to the notebook type PC 100, the EC 6 turns on the power supply to the external graphics chip 10 and sets the image changeover signal to the external graphics chip 10 (step ST31 of FIG. 4, (1) of FIG. 5). Then, the EC 6 changes the SYS_PWROK signal from the Low level to the High level to permit the chip set 2 (south bridge 4) to cancel the system resetting (step ST32 of FIG. 4, (2) of FIG. 5). In response to the change of the SYS_PWROK signal, the PWROK terminal of the chip set 2 changes from the Low level to the High level and the chip set 2 changes the system resetting signal SYS_RESET# from the Low level to the High level to cancel the system resetting (step ST33 of FIG. 4, (3) and (4) of FIG. 5). When the system resetting is cancelled, operation of the CPU 1 is started and the BIOS 23 starts the POST process described hereinabove (initialization process of the pertaining hardware components). Further, when the EC 6 detects the change of the SYS_PWROK signal to the High level, it changes the SYS_PWROK signal from the High level to the Low level.

During the process of the POST process described above, the BIOS 23 acquires the state of the OS recorded in the preceding operation cycle in the nonvolatile memory 15 (step ST34 of FIG. 4). Based on the acquired state of the OS, the BIOS 23 decides whether or not the OS is in the power saving mode such as the standby mode or the rest mode (step ST35). If the OS is not in the power saving mode (No at step ST35), then the BIOS 23 issues an enquiry about the state of the graphics changeover switch 7 to the EC 6 (step ST36). In response to the enquiry, the EC 6 acquires the state of the graphics changeover switch 7 and issues a reply of the acquired state to the BIOS 23 (step ST37). The BIOS 23 receives the reply and decides based on the reply which one of the graphics chips is selected (step ST39). Then, if the external graphics chip 10 is selected, then the BIOS 23 performs an invalidation process of the built-in graphics chip 5 (step ST39). On the other hand, if the built-in graphics chip 5 is selected, then the BIOS 23 performs an invalidation process of the external graphics chip 10 (step S40). It is to be noted that, if the OS is in the power saving mode at step ST35 described above (Yes at step ST35), then the BIOS 23 acquires information regarding the graphics chip selected before the transition to the power saving mode from the nonvolatile memory 15 (step ST38). Thereafter, the processing advances to step ST39. After the invalidation process of the graphics chip which is not selected ends, the BIOS 23 stores the information regarding the selected graphics chip into the nonvolatile memory 15 (step S41). Then, the BIOS 23 issues a notification of the selected graphics chip to the EC 6 (step ST42).

The EC 6 receives the notification and lights the LED corresponding to the selected graphics chip (step ST43). Then, the EC 6 decides the selected graphics chip (step ST44) and sets, if the built-in graphics chip 5 is selected, the image changeover signal to the built-in graphics chip 5 side and outputs the image changeover signal to the switch IC 12 (step ST45).

Then, the BIOS 23 performs initialization of the selected graphics chip (step ST46). Then, the BIOS 23 decides the selected graphics chip again (step ST47 of FIG. 4, (6) of FIG. 5). If the built-in graphics chip 5 is selected, then the BIOS 23 issues a notification of turning off of the power supply to the external graphics chip 10 to the EC 6 (step ST48 of FIG. 4). The EC 6 receives the notification and turns off the power supply to the external graphics chip 10 (step ST49 of FIG. 4, (7) of FIG. 5). On the other hand, if the external graphics chip 10 is selected, then the power supply to the external graphics chip 10 is always on. The graphics chip selection process upon starting ends therewith.

Figure 6:
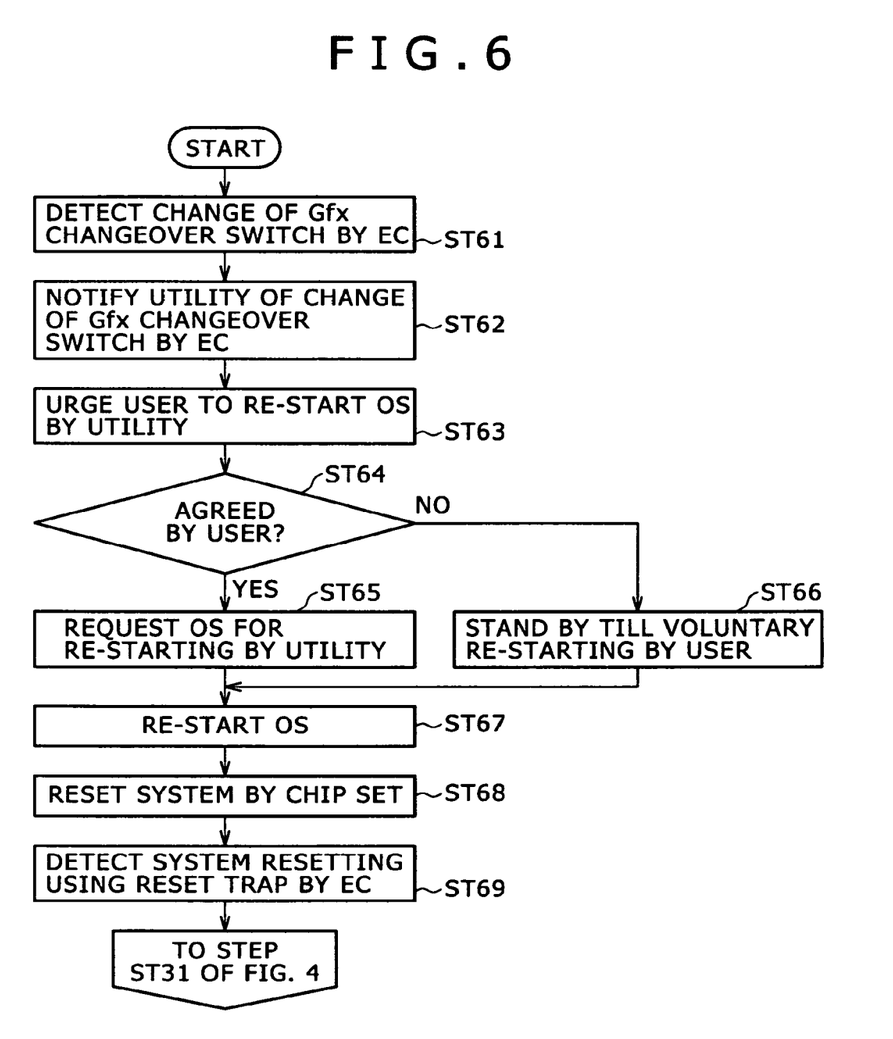
FIG. 6 is a flow chart illustrating a flow of a graphic chip selection process executed upon system resetting of the notebook type PC.
Figure 7:
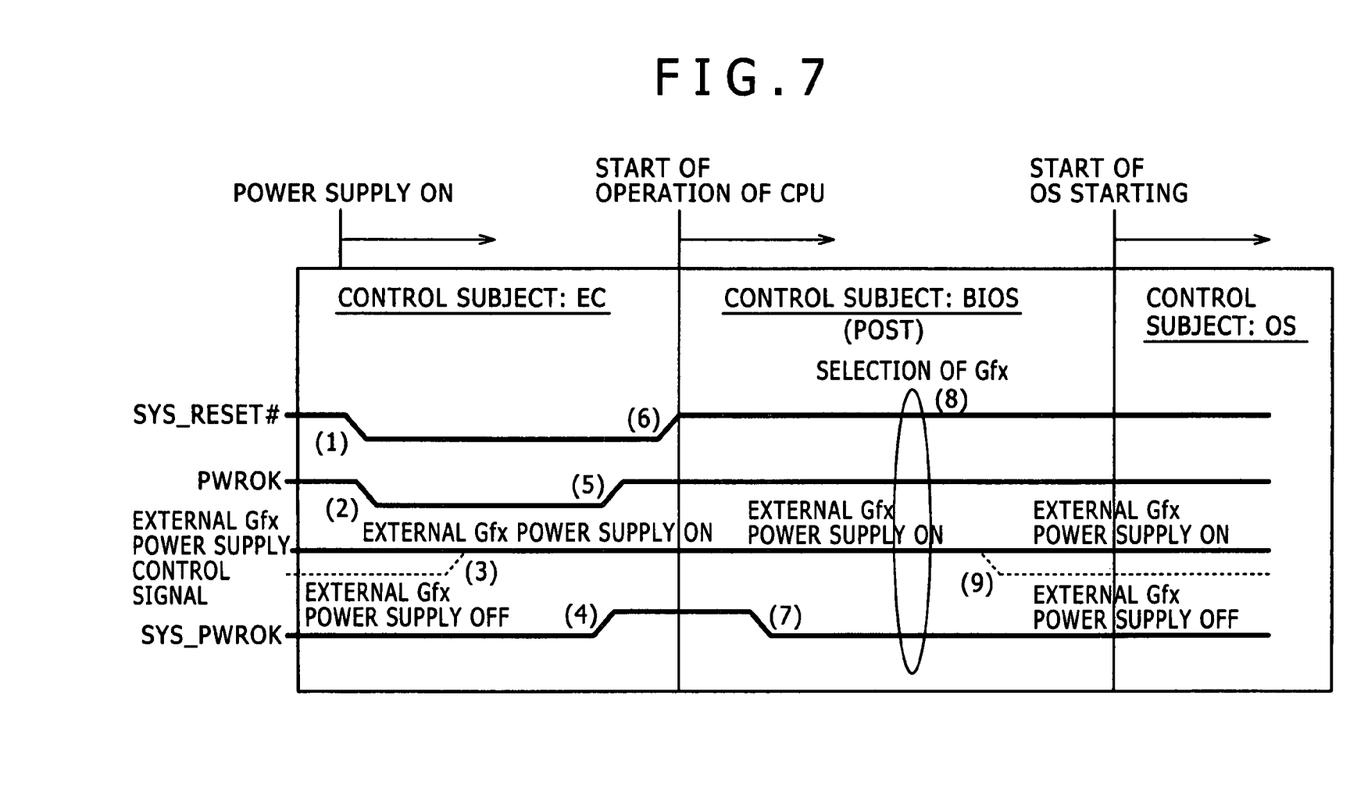
FIG. 7 is a timing chart of signals of the notebook type PC in the graphics chip selection process illustrated in FIG. 6.

Now, a selection process of a graphics chip upon system resetting of the notebook type PC 100 is described. FIG. 6 illustrates a flow of a graphics chip selection process upon system resetting of the notebook type PC 100, and FIG. 7 illustrates signals in the graphics chip selection process. It is to be noted that "Utility" in FIG. 6 represents the utility software 21 described hereinabove.

Referring first to FIG. 6, if the EC 6 detects a change of the state of the graphics changeover switch 7 while the system is operative (step ST61), then the EC 6 issues a notification of the change to the utility software 21 (step ST62). The utility software 21 receives the notification and urges the user to re-start the OS (step ST3). In particular, the utility software 21 causes the image display section 13 to display such a dialog message as, for example, "Please re-start the system". If the user agrees with re-starting of the system in response to the display (Yes at step ST64), then the utility software 21 issues a request for re-starting to the OS (step ST65). On the other hand, if the user does not agree with such re-starting (No at step ST64), then the utility software 21 waits until the user voluntarily re-starts the system (step ST66). Since the EC 6 and the utility software 21 have a communication interface such as the PIC as described hereinabove with reference to FIG. 2, the dialog display described above can be performed from the utility software 21. This display can be understood more easily and is more effective than a warning indication, for example, by an LED, and a re-starting permission can be obtained smoothly from the user.

Thereafter, the OS receives the re-starting request from the utility software 21 and performs a re-starting process (step ST67). The chip set 2 changes the system resetting signal SYS_RESET# to the Low level to reset the system (step ST68 of FIG. 6, (1) of FIG. 7). When the system resetting signal SYS_RESET# changes to the Low level, the PWROK terminal of the south bridge 4 shown in FIG. 3 changes to the Low level ((2) of FIG. 7), and the system resetting signal SYS_RESET# is kept at the Low level.

Then, the EC 6 detects the resetting of the system by means of the reset track mechanism described hereinabove (step ST69 of FIG. 6). Then, the EC 6 turns on the power supply to the external graphics chip 10 so that no problem occurs even if a voltage is applied between the terminals of the external graphics chip 10 after the resetting is cancelled ((3) of FIG. 7). Then, after the power supply to the external graphics chip 10 is turned on, the EC 6 sets the SYS_PWROK signal from the Low level to the High level in order to cancel the resetting and outputs the SYS_PWROK signal of the High level to the chip set 2 ((4) of FIG. 7). When the SYS_PWROK signal changes from the Low level to the High level, the PWROK signal of the chip set 2 changes from the Low level to the High level ((5) of FIG. 7). Consequently, the chip set 2 changes the system resetting signal SYS_RESET# from the Low level to the High level to perform cancellation of the resetting of the system ((6) of FIG. 7).

Thereafter, similar processes to those at steps S31 et seq. of FIG. 4 and those at steps (5) et seq. of FIG. 5 are executed, thereby ending the graphics chip selection process upon system resetting.

As described above, according to the present embodiment, a user-friendly man-machine interface which can readily change over two graphics chips having different drawing processing capacities can be provided, and both of low power consumption (long battery duration) and a high drawing performance can be achieved. Further, also upon system re-starting, changeover between the graphics chips can be performed readily while the graphics chips are protected suitably by the reset trap mechanism. Further, since the two graphics chips are provided, flexible control can be anticipated by adjusting the power consumption over a wide range when compared with an alternative case wherein the power consumption is controlled dynamically using a single graphics chip.

It is to be noted that the present invention is not limited to the specific embodiment described hereinabove, but can be carried out in various modified forms without departing from the spirit and the scope of the present invention.

In the embodiment described above, the user can change over the graphics chip to be used between the built-in graphics chip 5 and the external graphics chip 10 depending upon which one of the battery duration and the performance should take precedence. However, changeover between the graphics chips may be performed depending also upon some other item than the precedence item. As described hereinabove, while the external graphics chip 10 has a high drawing performance, it exhibits high power consumption and generates a great amount of heat. Therefore, when the external graphics chip 10 is to be used to perform a drawing process, a high speed of rotation of the fan 14 is required and also the noise by the fan 14 has an increasing tendency. Therefore, when the EC 6 is to be used to perform a drawing process, the EC 6 decreases the speed of rotation of the fan 14 so that low noise generation can be achieved. In other words, changeover between the graphics chips can be performed depending upon whether or not importance should be attached to low noise generation.

In the embodiment described above, since changeover between the graphics chips is performed by a mechanical switch like the graphics changeover switch 7, explicit selection of a graphics chip by the user is required. However, also it is possible to otherwise configure the notebook type PC 100 such that it automatically detect an object of use or an environment of use of the user and changes over between the graphics chips or urges the user to perform such changeover.

For example, since the performance and the battery duration or low noise generation have a tradeoff relationship to each other, changeover between the graphics chips may be performed in the following manner. In particular, the notebook type PC decides to which one of the performance and the battery duration or low noise generation the user wants to give priority depending upon from which one of a battery and an AC adapter the notebook type PC receives the power supply. Then, if the notebook type PC operates with a battery, then the built-in graphics chip 5 is selected, but if the notebook type PC operates with an AC adapter, then the external graphics chip 10 is selected.

Or, changeover between the graphics chips may be performed in response to various environments and objects of use relating to the tradeoff relationship between the performance and the power consumption in the following manner. In particular, changeover between the graphics chips may be performed in response to whether or not an external apparatus for functional expansion such as a docking station or a port replicator or to a connecting or disconnecting operation of such an external apparatus; in response to whether or not an external monitor is connected or to a connecting or disconnecting operation of an external monitor; in response to power supply setting of the OS; in response to a starting situation of application software; in response to power consumption of the entire system; in response to the remaining amount of the battery; or in response to a surrounding environmental level. In other words, if the graphics changeover switch 7 is configured as a performance changeover switch, then a more flexible graphics chip changeover process can be achieved.

In the embodiment described hereinabove, when the built-in graphics chip 5 is selected, power supply to the external graphics chip 10 is stopped. However, when the built-in graphics chip 5 is selected, the power supply to those devices which are used but comparatively less frequently may be stopped or the operation clock number for the CPU 1 or the memory clock number may be decreased in addition to the stopping of the power supply to the external graphics chip 10. This further enhances the power saving effect.

In the embodiment described above, due to the restriction of the Windows (registered trademark) that the hotplug/un-plug during operation of a graphic chip is not supported, changeover between the graphic chips can be performed only upon starting and upon re-starting. However, conversely speaking, changeover between the graphics chips can be performed after the OS is started only if the changeover does not involve power supply control. Further, if an OS which is ready for the hotplug/unplug is available, then it can be used also for changeover between the graphics chips which involves power supply control.

Further, in the embodiment described above, the notebook type PC 100 is taken as an example of an information processing apparatus. However, the present invention can be applied to various information processing apparatus into which a graphics chip can be incorporated such as, for example, a desk-top type computer, a PDA (Personal Digital Assistance), an audio/visual apparatus, a portable telephone set and a game machine.

The invention claimed is:

1. An information processing apparatus, comprising:
a first graphics chip having a first drawing processing capacity and being capable of producing a first image signal;

a second graphics chip having a second drawing processing capacity higher than the first drawing processing capacity and being capable of producing a second image signal;

a switch configured to select one of the first graphics chip and the second graphics chip based on a user input operation;

a control section configured to stop power supply to the one of the first graphics chip and second graphics chip which is not selected;

a detection section configured to detect a restarting event of the information processing apparatus following the stoppage of power supply to the not-selected graphics chip; and a supplying section configured to supply power to the first and second graphics chips if the restarting event is detected by the detection section following the stoppage.

2. The information processing apparatus according to claim 1, further comprising a notification section configured to notify the user which one of the first and the second graphics chips is currently selected.

3. The information processing apparatus according to claim 2, wherein the notification section comprising a light emitting diode (LED) configured to notify the user which one of the first and the second graphics chips is currently selected.

4. The information processing apparatus according to claim 1, further comprising:

an output changeover section capable of selectively outputting one of the first or second image signals; and a control section configured to control the output of the outputting one of the first or second image signals.

5. The information processing apparatus according to claim 4, wherein, if the selection of one of the graphics chips is changed by the switch while the information processing apparatus is in a started state, then the control section causes display of a screen which urges the user to re-start the information processing apparatus.

6. The information processing apparatus according to claim 4, further comprising a fan configured to radiate heat generated in the information processing apparatus, the control section being configured, based on the user operation, to set the speed of rotation of the fan to a first speed of rotation when the first graphics chip has been selected and to set the speed of rotation of the fan to a second speed of rotation higher than the first speed of rotation when the second graphics chip has been selected.

7. The information processing apparatus according to claim 6, wherein the control section stops the power supply to a less-frequently-used device, or decreases a CPU operation clock number or a memory clock number, in addition to stop the power supply to the second graphics chip.

8. The information processing apparatus according to claim 4, further comprising a central processing unit (CPU) configured to control operation of the entire information processing apparatus, the control section being configured, based on the user operation, to set an operation clock number of the CPU to a first clock number when the first graphics chip has been selected and to set the operation clock number of the CPU to a second clock number higher than the first clock number when the second graphics chip has been selected.

9. The information processing apparatus according to claim 4, further comprising a power saving section configured to place the information processing apparatus into a power saving mode, the control section being configured, when the information processing apparatus is placed in the power saving mode, to store information regarding the selection state of the graphics chips by the user and, when the information processing apparatus returns from the power saving mode, to cause the output changeover section to output an image signal from the graphics chip selected before the placement into the power saving mode based on the stored information.

10. An information processing method, comprising:

outputting one of a first image signal output from a first graphics chip having a first drawing processing capacity or a second image signal output from a second graphics chip having a second drawing processing capacity higher than the first drawing processing capacity, the first and second graphics chips being associated with an image processing apparatus;

acquiring a user selection of one of the first graphics chip and the second graphics chip;

stopping power supply to the one of the first graphics chip and second graphics chips which does not correspond to the user selection;

detecting a restarting event of the information processing apparatus following the stoppage of power supply to the not-selected graphics chip; and supplying power to the first and second graphics chips if the restarting event is detected following the stoppage.

11. An information processing apparatus, comprising:

a first graphics chip consuming a first power consumption;

a second graphics chip consuming a second power consumption higher than the first power consumption;

a switch configured to allow a user to select the first graphics chip or the second graphics chip;

a control section configured to stop power supply to the second graphics chip when the first graphics chip is selected by the user;

a detection section configured to detect a restarting event of the information processing apparatus following the stoppage of power supply to the second graphics chip; and a supplying section configured to supply power to the first and second graphics chips if the restarting event is detected by the detection section following the stoppage.

12. An information processing apparatus, comprising:

a first graphics chip having a first drawing processing capacity and being capable of producing a first image signal;

a second graphics chip having a second drawing processing capacity higher than the first drawing processing capacity and being capable of producing a second image signal;

a switch configured to allow a user to select the first graphics chip or the second graphics chip;

a control section configured to stop power supply to the one of the graphics chips which is not selected by the user;

a detection section configured to detect a restarting event of the information processing apparatus following the stoppage of power supply to the not-selected graphics chip; and a supplying section configured to supply power to the first and second graphics chips if the restarting event is detected by the detection section following the stoppage.

* * * * *